US007291279B2

(12) United States Patent
Dill et al.

(10) Patent No.: US 7,291,279 B2
(45) Date of Patent: Nov. 6, 2007

(54) METHOD OF MAKING A READ SENSOR WHILE PROTECTING IT FROM ELECTROSTATIC DISCHARGE (ESD) DAMAGE

(75) Inventors: Frederick Hayes Dill, South Salem, NY (US); Meng Ding, Mountain View, CA (US); Kuok San Ho, Santa Clara, CA (US); Jordan Asher Katine, San Jose, CA (US); Scott Arthur MacDonald, San Jose, CA (US); Huey-Ming Tzeng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 297 days.

(21) Appl. No.: 10/835,807

(22) Filed: Apr. 30, 2004

(65) Prior Publication Data

US 2005/0241138 A1 Nov. 3, 2005

(51) Int. Cl.
*B44C 1/22* (2006.01)
*H01L 21/00* (2006.01)
*G11B 5/33* (2006.01)
*G11B 5/127* (2006.01)
(52) U.S. Cl. .............................. 216/22; 438/3; 360/323
(58) Field of Classification Search .................. 216/22; 438/3; 360/323
See application file for complete search history.

(56) References Cited

U.S. PATENT DOCUMENTS 5,805,390 A 9/1998 Takeura 6,067,220 A 5/2000 Ahmann et al.
6,262,869 B1 * 7/2001 Lin et al. ............... 360/324.11
6,267,903 B1 7/2001 Watanuki
6,415,500 B1 7/2002 Han et al.
6,470,566 B2 10/2002 Hsiao et al.

(Continued)

FOREIGN PATENT DOCUMENTS

| JP | 2000048326 | 2/2000 |
| JP | 2000322715 | 11/2000 |
| JP | 2000322716 | 11/2000 |
| JP | 2003006820 | 1/2003 |
| JP | 2003016612 | 1/2003 |

OTHER PUBLICATIONS

Magneto Resistive-Sensor Protection on Wafer Level, IBM Technical Bulletin, Feb. 1996, pp. 207-208, vol. 39, Pub. No. 2.

*Primary Examiner*—Roberts Culbert
(74) *Attorney, Agent, or Firm*—John J. Oskorep, Esq.; Matthew Zises

(57) ABSTRACT

A method of making a read sensor while protecting it from electrostatic discharge (ESD) damage involves forming a severable shunt during the formation of the read sensor. The method may include forming a resist layer over a plurality of read sensor layers; performing lithography with use of a mask to form the resist layer into a patterned resist which exposes left and right side regions over the read sensor layers as well as a shunt region; etching, with the patterned resist in place, to remove materials in the left and right side regions and in the shunt region; and depositing, with the patterned resist in place, left and right hard bias and lead layers in the left and right side regions, respectively, and in the shunt region for forming a severable shunt which electrically couples the left and right hard bias and lead layers together for ESD protection.

22 Claims, 9 Drawing Sheets

U.S. PATENT DOCUMENTS 6,631,056 B1 10/2003 Asatani et al.
2002/0066177 A1 6/2002 Takeda et al.
2003/0184920 A1 10/2003 Jarrett et al.
2003/0210501 A1 11/2003 Voldman

* cited by examiner

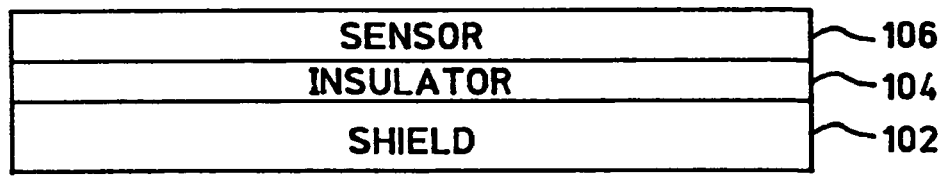
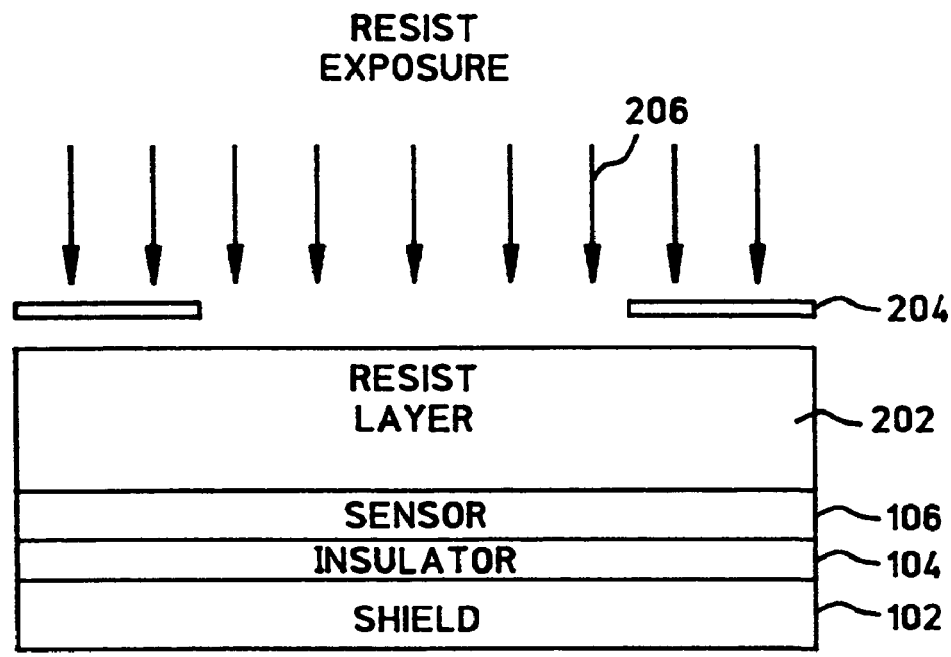
FIG. 2
FIG. 3
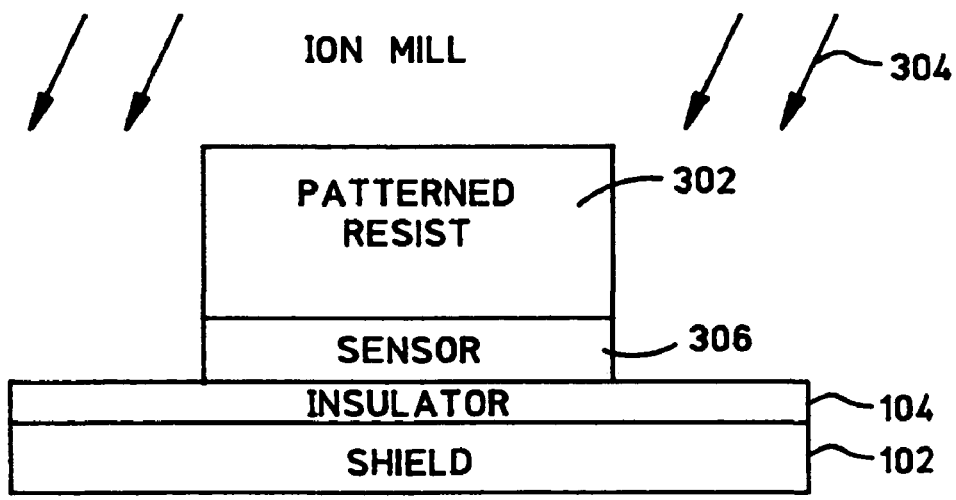
FIG. 4

METHOD OF MAKING A READ SENSOR WHILE PROTECTING IT FROM ELECTROSTATIC DISCHARGE (ESD) DAMAGE

BACKGROUND OF THE INVENTION

1. Field of the Invention

The present invention relates to methods of protecting read sensors from electrostatic discharge (ESD) damage during their manufacture.

2. Description of the Related Art

Read sensors of magnetic heads are sensitive devices which may be easily damaged during manufacturing by electrostatic discharge (ESD). During manufacturing, a plurality of magnetic heads are formed on a wafer. For each magnetic head, a read sensor is formed over a first gap layer (G1) which has a first shield layer (S1) formed beneath it. Above the read sensor is a second gap layer (G2) which has a second shield layer (S2) formed over it. The first and second gap layers and are made of an insulating material, such as alumina, whereas the first and second shield layers are made of a conductive material, such as Permalloy. Since these conductive materials are separated by the insulating materials, different electrical potentials may exist between the read sensor and shield layers. From the constant handling of the magnetic heads during manufacturing, electrostatic charge may undesirably build up and damage the read sensors. This may result in serious yield losses, especially as the sensor element becomes smaller in both film thickness and areal dimension.

Accordingly, there is a need to develop ways in which to protect read sensors from ESD damage during their manufacture.

SUMMARY

In one illustrative example of the present invention, a method of making a read sensor while protecting it from electrostatic discharge (ESD) damage involves forming a severable shunt for ESD protection during the formation of the read sensor. In particular, the method may include the steps of forming a resist layer over a plurality of read sensor layers; performing lithography with use of a mask to form the resist layer into a patterned resist which exposes left and right side regions over the read sensor layers as well as a shunt region; etching, with the patterned resist in place, to remove materials in the left and right side regions and in the shunt region; and depositing, with the patterned resist in place, left and right hard bias and lead layers in the left and right side regions, respectively, and in the shunt region for forming a severable shunt which electrically couples the left and right hard bias and lead layers together for ESD protection.

BRIEF DESCRIPTION OF THE DRAWINGS

For a fuller understanding of the nature and advantages of the present invention, as well as the preferred mode of use, reference should be made to the following detailed description in conjunction with the accompanying drawings:

FIG. 2 is a first of ten cross-sectional views of FIGS. 2-11 showing partially formed read sensor structures associated with the steps of the flowchart of FIG. 1, where a plurality of read sensor layers are formed over a substrate;

FIG. 3 is a second of ten cross-sectional views of FIGS. 2-11 for the method of FIG. 1, which is the same as FIG. 2 except that a first resist layer is formed over the read sensor layers and a first mask is utilized to pattern the first resist layer;

FIG. 4 is a third often cross-sectional views of FIGS. 2-11 for the method of FIG. 1, which is the same as FIG. 3 except that the first patterned resist is shown and utilized to remove read sensor materials by ion milling to thereby form a stripe height (SH) of the read sensor;

DETAILED DESCRIPTION OF THE PREFERRED EMBODIMENTS

In one illustrative example of the present invention, a method of making a read sensor while protecting it from electrostatic discharge (ESD) damage involves forming a severable shunt for ESD protection during the formation of the read sensor. The method may include the steps of forming a resist layer over a plurality of read sensor layers; performing lithography with use of a mask to form the resist layer into a patterned resist which exposes left and right side regions over the read sensor layers as well as a shunt region; etching, with the patterned resist in place, to remove materials in the left and right side regions and in the shunt region; and depositing, with the patterned resist in place, left and right hard bias and lead layers in the left and right side regions, respectively, and in the shunt region for forming a severable shunt which electrically couples the left and right hard bias and lead layers together for ESD protection.

The following description represents several embodiments presently contemplated for carrying out the present invention. This description is made for the purpose of illustrating the general principles of the present invention and is not meant to limit the inventive concepts claimed herein.

Figure 1:
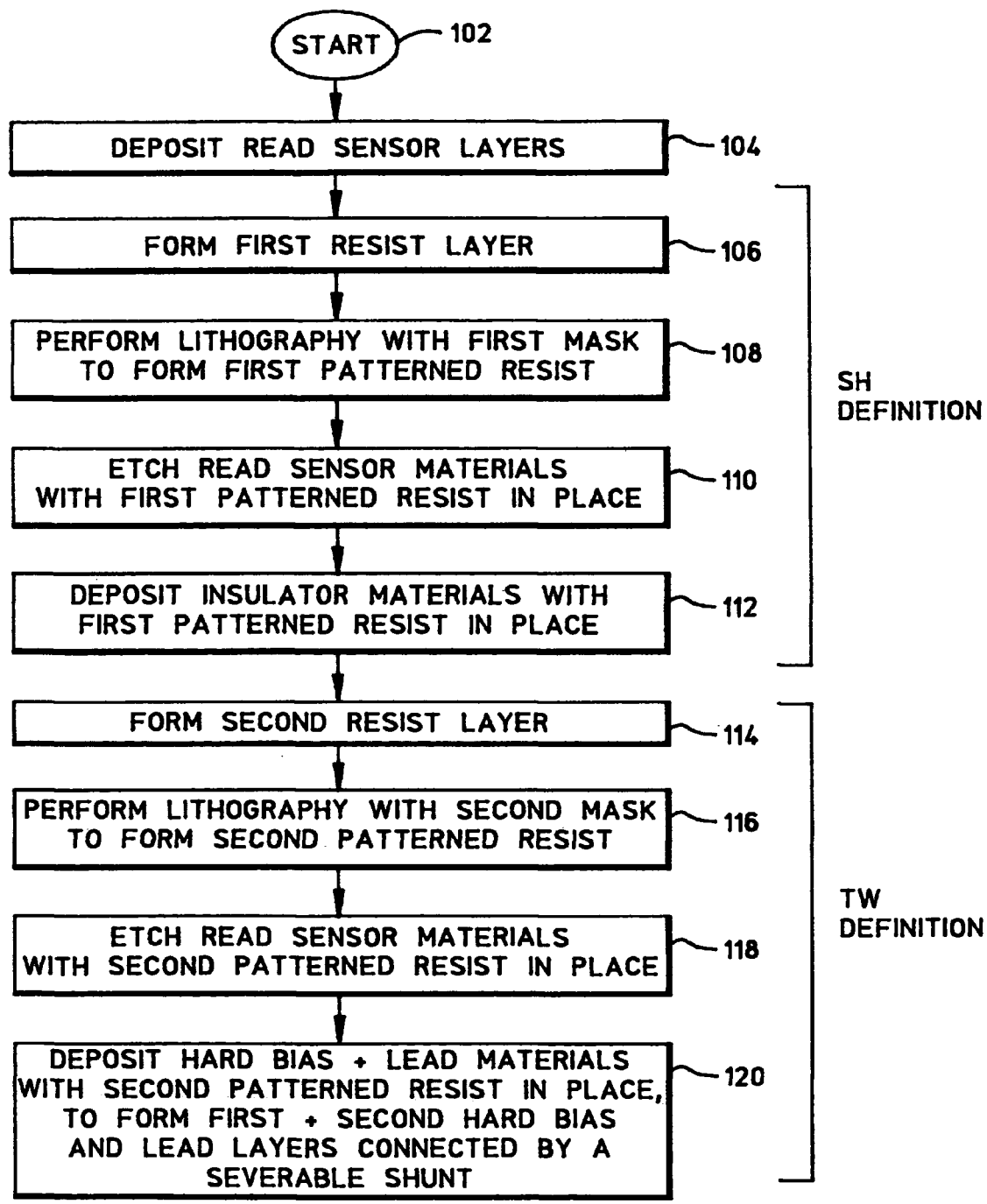
FIG. 1 is a flowchart which describes a method of making a read sensor of a magnetic head while protecting the read sensor from electrostatic discharge (ESD) damage.

FIG. 1 is a flowchart which describes a method of making a read sensor of a magnetic head while protecting the read sensor from electrostatic discharge (ESD) damage. The method involves forming a severable shunt for ESD protection while the read sensor is being made. FIGS. 2-11 are cross-sectional views showing partially formed read sensor structures associated with the steps of the flowchart of FIG. 1. In the following description, reference will be made to the flowchart of FIG. 1 in combination with the cross-sectional views of FIGS. 2-11.

Beginning with FIGS. 1 and 2 in combination, a plurality of read sensor layers 106 are deposited over an insulator layer 104 (step 102 of FIG. 1). Read sensor layers 106 include a plurality of well-known material layers which make up a magnetoresistive (MR) or giant MR (GMR) sensor. Insulator layer 104 is itself formed over a shield layer 102, which may be one of two shield layers of the magnetic head. Insulator layer 104 may be any suitable dielectric material, such as alumina ($Al_2O_3$) or $SiO_2$.

In FIG. 3, a resist layer 202 is formed over read sensor layers 106 (step 106 of FIG. 1). Resist layer 202 may be a photoresist layer, for example. The photoresist layer, which may be made of a polyphenolic polymer or polyvinylphenol, may be spun on top of read sensor layers 106. A polyphenolic polymer is a copolymer of phenol and formaldehyde, and is also known commercially as Novolak which can be purchased from Hoechst Celanese, Sumitomo, or Shipley. Such a photoresist layer may be formed to a thickness within the range of about 150-600 nanometers (nm). To form a desired patterned resist, lithography is performed on resist layer 202 with use of a mask 202 (step 108 of FIG. 1). If resist layer 202 is a photoresist, resist layer 202 is light-exposed 206 in regions that are to be removed with use of mask 202. This is provided that the photoresist is a positive photoresist. If the photoresist is a negative photoresist, it is light exposed in the regions that are to be retained. Resist layer 202 is then subjected to a basic developer solution. The developer used may be, for example, aqueous potassium hydroxide (KOH) developer, such as 1:6 2401 (Shipley) or 1:4 AZ 400 K (Hoechst Celanese) wherein the ratios are the developer to water. In a 1:6 2401 developer, the develop time can be up to 3 minutes for the purpose of removing light-exposed photoresist portions. Other basic aqueous developers may be utilized as well, such as 2.38% tetramethylammonium hydroxide (TMAH). As an alternative or additional step, other lithography techniques may be utilized such as electron beam (E-beam) lithography.

A resulting patterned resist 302 is illustrated in FIG. 4. Patterned resist 302 is formed in a central region and exposes end regions which surround the central region. With patterned resist 302 kept in place, an etching process 304 is then performed to remove read sensor layers in the end regions which surround patterned resist 302 (step 110 of FIG. 1). This etching process 304 defines a stripe height (SH) for a read sensor structure 306. Etching process 304 may be any suitable etching process, such as ion milling. As shown in the resulting structure of FIG. 4, top surfaces of insulator layers 104 are exposed in the end regions.

Figure 5:
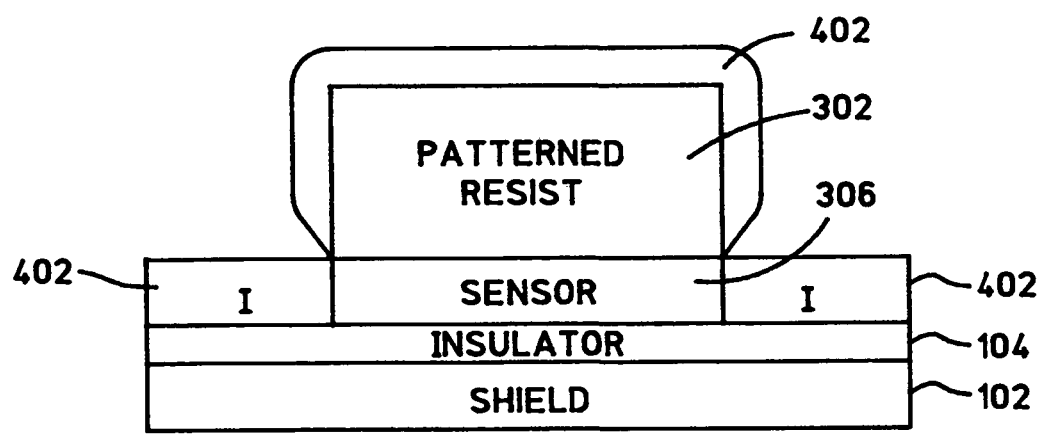
FIG. 5 is a fourth of ten cross-sectional views of FIGS. 2-11 for the method of FIG. 1, which is the same as FIG. 4 except that insulator materials are deposited with the first patterned resist in place.
Figure 6:
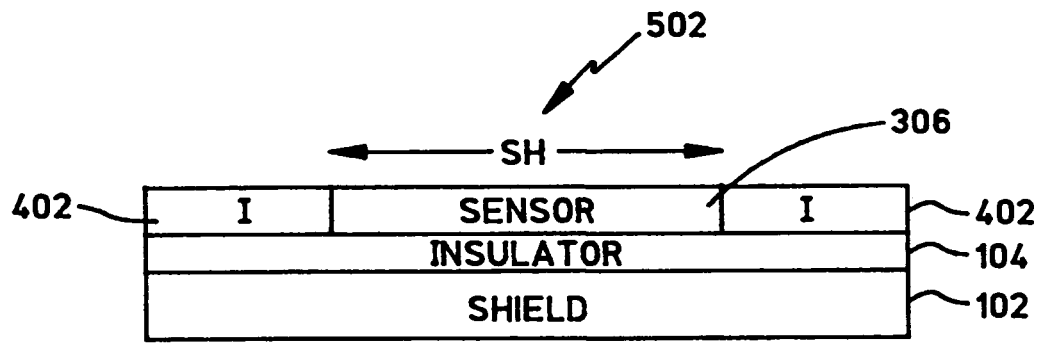
FIG. 6 is a fifth of ten cross-sectional views of FIGS. 2-11 for the method of FIG. 1, which is the same as FIG. 5 except that the first patterned resist is removed to reveal the stripe height (SH) of the read sensor.

In FIG. 5, it is shown that additional insulator layers 402 are deposited in the end regions where the read sensor materials were removed (step 112 of FIG. 1). During this step, insulator materials 402 are formed over the top and sides of photoresist layer 302 as well. Insulator layers 402 may be any suitable dielectric material, such as alumina ($Al_2O_3$), silicon-dioxide ($SiO_2$), or tantalum-oxide ($TaO_2$). Patterned resist 302 is then removed with use of a suitable solvent or other technique. The resulting structure is shown in FIG. 6, which reveals read sensor structure 306 having a stripe height (SH) 502. A chemical-mechanical polishing (CMP) may be performed to planarize the top surface of read sensor structure 306 and insulator layers 402.

Figure 7:
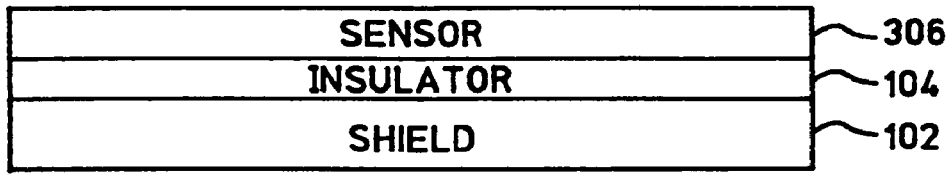
FIG. 7 is a sixth of ten cross-sectional views of FIGS. 2-11 for the method of FIG. 1, which is the same as FIG. 6 except that the other dimension is shown.
Figure 8:
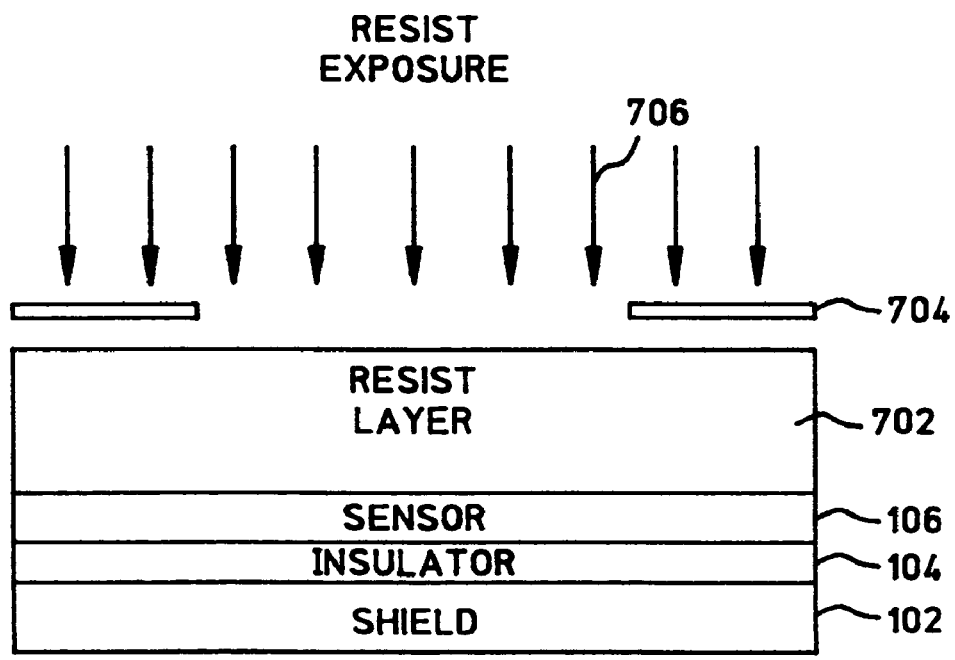
FIG. 8 is a seventh of ten cross-sectional views of FIGS. 2-11 for the method of FIG. 1, which is the same as FIG. 7 except that a second resist layer is formed over the read sensor layers and a second mask is utilized to pattern the second resist layer.

A view of the wafer in the other dimension is shown in FIG. 7, for subsequently defining the trackwidth (TW) for the read sensor. In FIG. 8, a resist layer 702 is formed over read sensor structure 306 (step 114 of FIG. 1). Resist layer 702 may be a photoresist layer as previously described, for example. Such a photoresist layer may be formed to a thickness within the range of about 150-600 nanometers (nm). To form a desired patterned resist, lithography is performed on resist layer 702 with use of a mask 702 (step 116 of FIG. 1). If resist layer 702 is a photoresist, resist layer 702 is light-exposed 706 in regions that are to be removed with use of mask 702. This is provided that the photoresist is a positive photoresist. If the photoresist is a negative photoresist, it is light exposed in the regions that are to be retained. Resist layer 702 is then subjected to a basic developer solution for creating the patterned resist structure. As an alternative or additional step, other lithography techniques may be utilized such as electron beam (E-beam) lithography.

Figure 9:
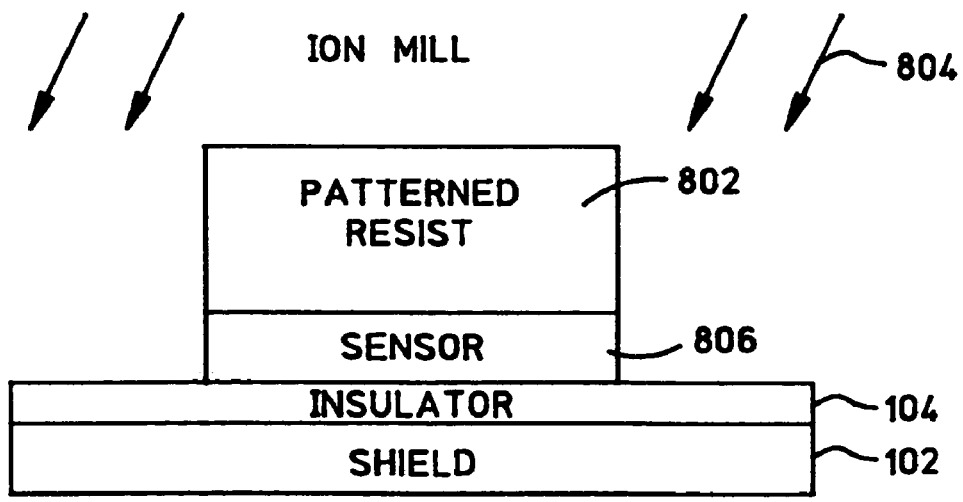
FIG. 9 is an eighth of ten cross-sectional views of FIGS. 2-11 for the method of FIG. 1, which is the same as FIG. 8 except that the second patterned resist is shown and utilized to remove read sensor materials by ion milling to thereby form a trackwidth (TW) of the read sensor.

A resulting patterned resist 802 is illustrated in FIG. 9. Patterned resist 802 is formed in a central region and exposes end regions which surround the central region. With patterned resist 802 kept in place, an etching process 804 is performed to remove read sensor materials in the end regions which surround patterned resist 802 (step 118 of FIG. 1). This etching process 804 defines a trackwidth (TW) for a read sensor 806. Etching process 804 may be any suitable etching process, such as ion milling. As shown in FIG. 9, top surfaces of insulator layers 104 are exposed in the end regions.

Figure 10:
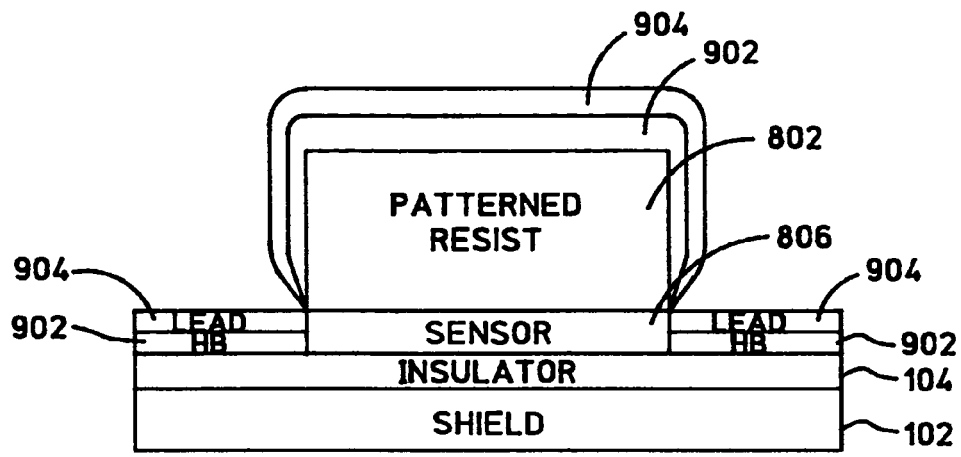
FIG. 10 is a ninth of ten cross-sectional views of FIGS. 2-11 for the method of FIG. 1, which is the same as FIG. 9 except that hard bias and lead materials are deposited with the second patterned resist in place, to thereby form first and second hard bias and lead layers in the end regions which are connected by a severable shunt in the front, rear, or side.
Figure 11:
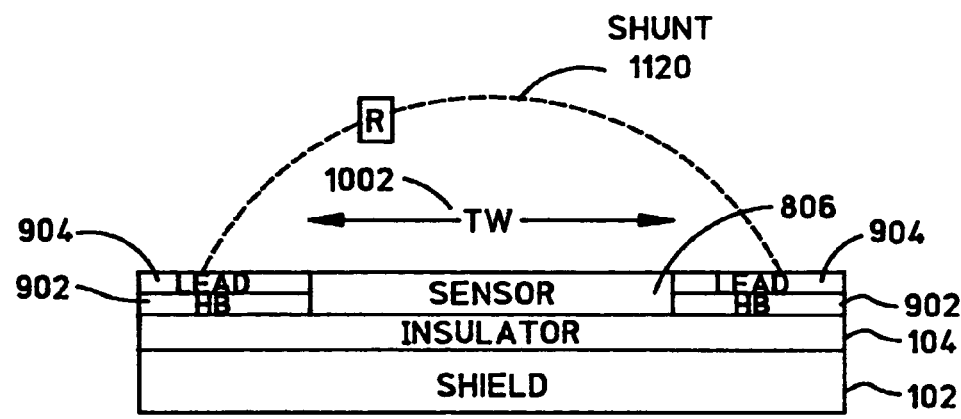
FIG. 11 is a tenth of ten cross-sectional views of FIGS. 2-11 for the method of FIG. 1, which is the same as FIG. 10 except that the second patterned resist is removed to reveal the TW of the read sensor.

In FIG. 10, left and right hard bias layers 902 are deposited in the end regions surrounding read sensor 806 (step 120 of FIG. 1). During this step, hard bias materials are formed over the top and sides of patterned resist 802 as well. Hard bias layers 902 may be any suitable hard magnet material, such as cobalt-platinum-chromium or other cobalt-based alloy. Left and right lead layers 904 are subsequently deposited in the end regions over hard bias layers 902 (also step 120 of FIG. 1). During this step, lead materials are also formed over the top and sides of patterned resist 802 as well. In general, leads layers 904 provide electrical connections for the flow of a sensing current Is from a current source to read sensor 806. Lead layers 904 may be any suitable conductive material, such as rhodium (Rh), tantalum (Ta), or gold (Au). Patterned resist 302 is then removed with use of a solvent or other suitable technique. The resulting structure is shown in FIG. 11, which illustrates a trackwidth (TW) of read sensor 806.

In accordance with the present invention, a severable shunt is simultaneously patterned and formed along with left and right hard bias and lead layers 902 and 904 during steps 116, 118, and 120 of FIG. 1 (FIGS. 8, 9, and 10, respectively). FIG. 11 shows a representation of this severable shunt 1120, which electrically connects the left and right hard bias and lead layers 902 and 904. Severable shunt 1120 is formed with the same materials as hard bias and lead layers 902 and 904 in the same step as their formation. Thus, hard bias and lead layers 902 and 904 are formed in the same plane as severable shunt 1120. Severable shunt 1120 is fabricated to protect the read sensor 806 from ESD damage during its manufacture. Severable shunt 1120 has a small resistance R through which ESD tends to flow so as to prevent ESD damage. For example, resistance R may be between close to zero and tens of ohms. The severable shunt and its formation are described in more detail below in relation to FIGS. 12-15.

Figure 12:
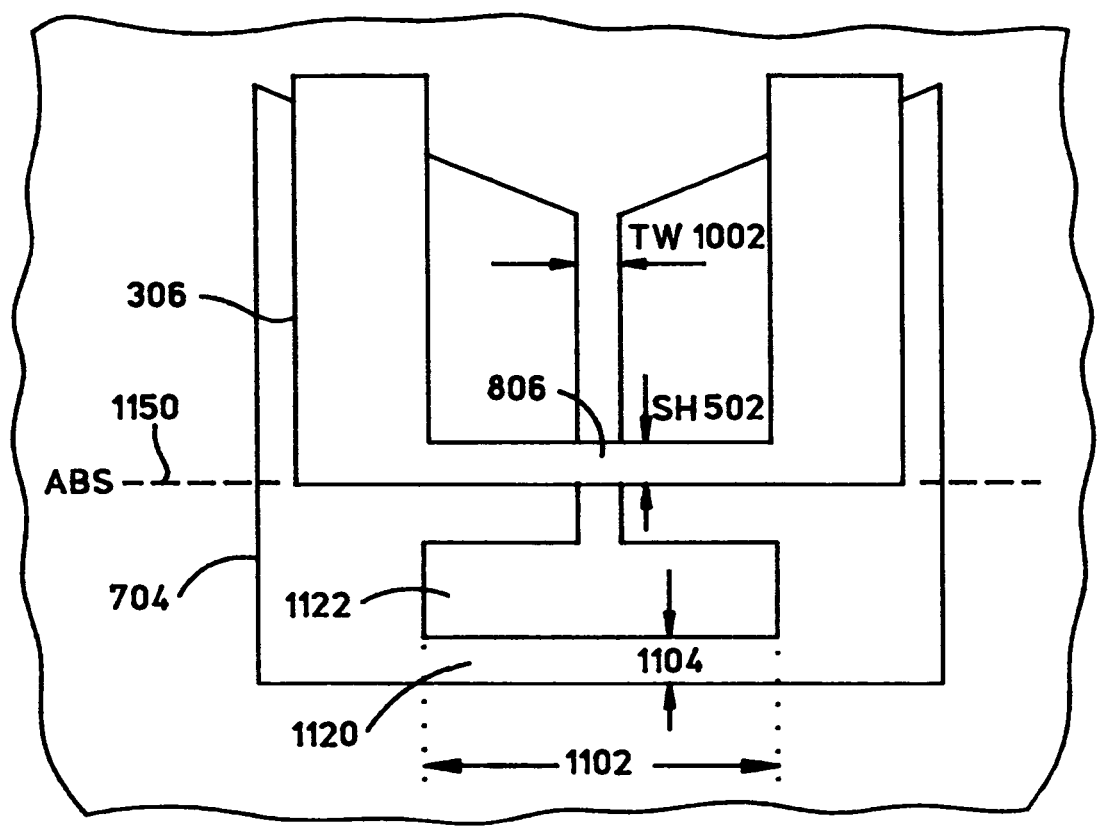
FIG. 12 is a top view of a partially constructed magnetic head which shows a partially-etched read sensor structure and the second mask used to form both the TW and the severable shunt in front of an air bearing surface (ABS)

FIGS. 12-15 are top views for further illustrating the shunting technique as well as to show different locations where the severable shunt may be formed. In particular, FIG. 12 is a top view of a partially constructed magnetic head which shows a partially-etched read sensor structure 306 and mask 704 used to simultaneously form both TW 1002 and severable shunt 1120 in front of an air bearing surface (ABS) 1150 of the magnetic head. Mask 704 is utilized to pattern the resist, which is utilized to etch and deposit materials for severable shunt 1120 at the same time it is being utilized for defining trackwidth (TW) 1002 of read sensor 806 and depositing its hard bias and lead layers (e.g. see FIGS. 8-10). Again, the hard bias and lead layers will be formed in the same plane as the shunt. The SH 502 of read sensor 806 has already been defined in FIG. 12, however, read sensor structure 306 will be subsequently etched in accordance with the pattern of mask 704 to define TW 1002 of read sensor 806. The same etch will remove all materials (e.g. insulator materials) within the boundaries of mask to form regions to deposit materials for severable shunt 1120 for coupling the lead and hard bias layers together. Note that severable shunt 1120 will be severed when the wafer is cut and lapped at ABS 1150.

Figure 13:
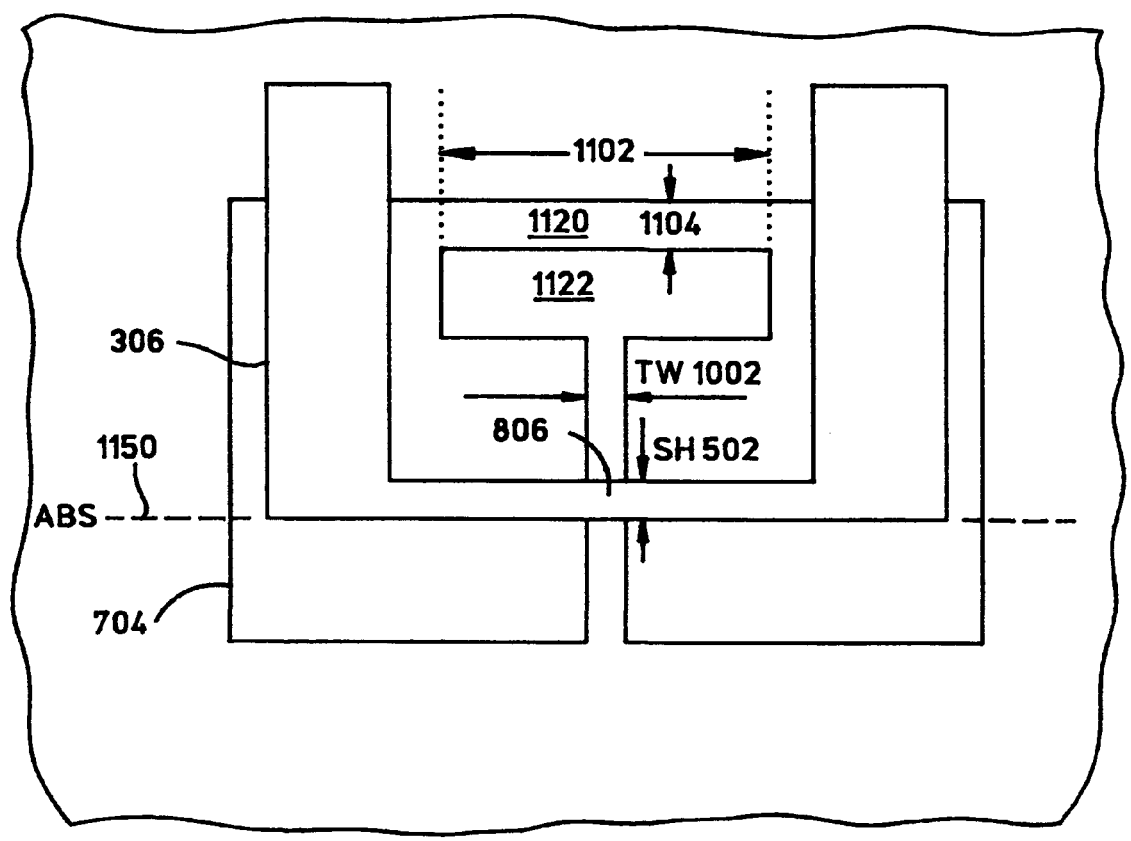
FIG. 13 is a top view of a partially constructed magnetic head which shows a partially-etched read sensor structure and the second mask used to form both the TW and the severable shunt behind the ABS.
Figure 14:
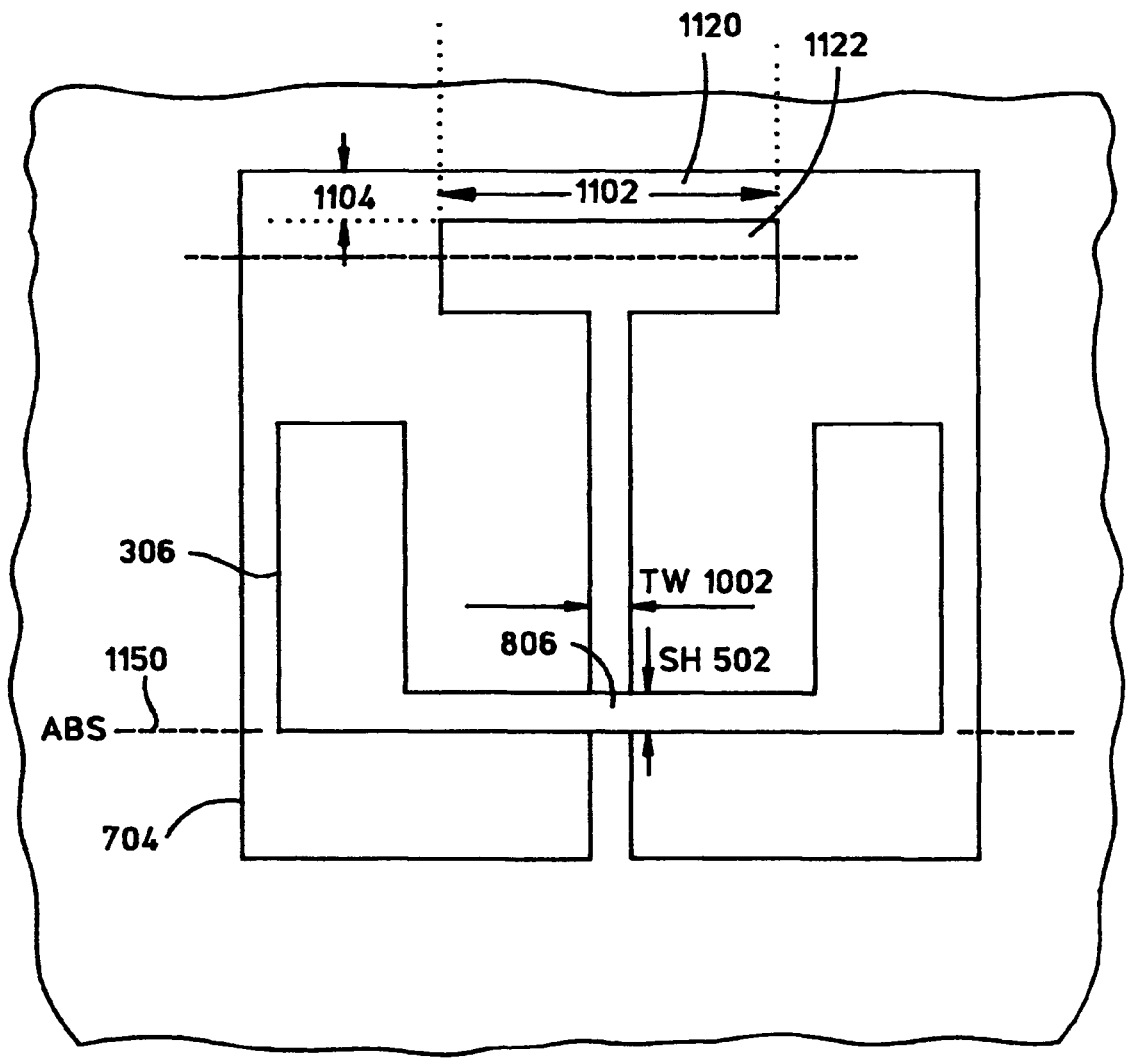
FIG. 14 is a top view of a partially constructed magnetic head which shows a partially-etched read sensor structure and the second mask used to form both the TW and the severable shunt well behind the ABS to be subsequently back-lapped.
Figure 15:
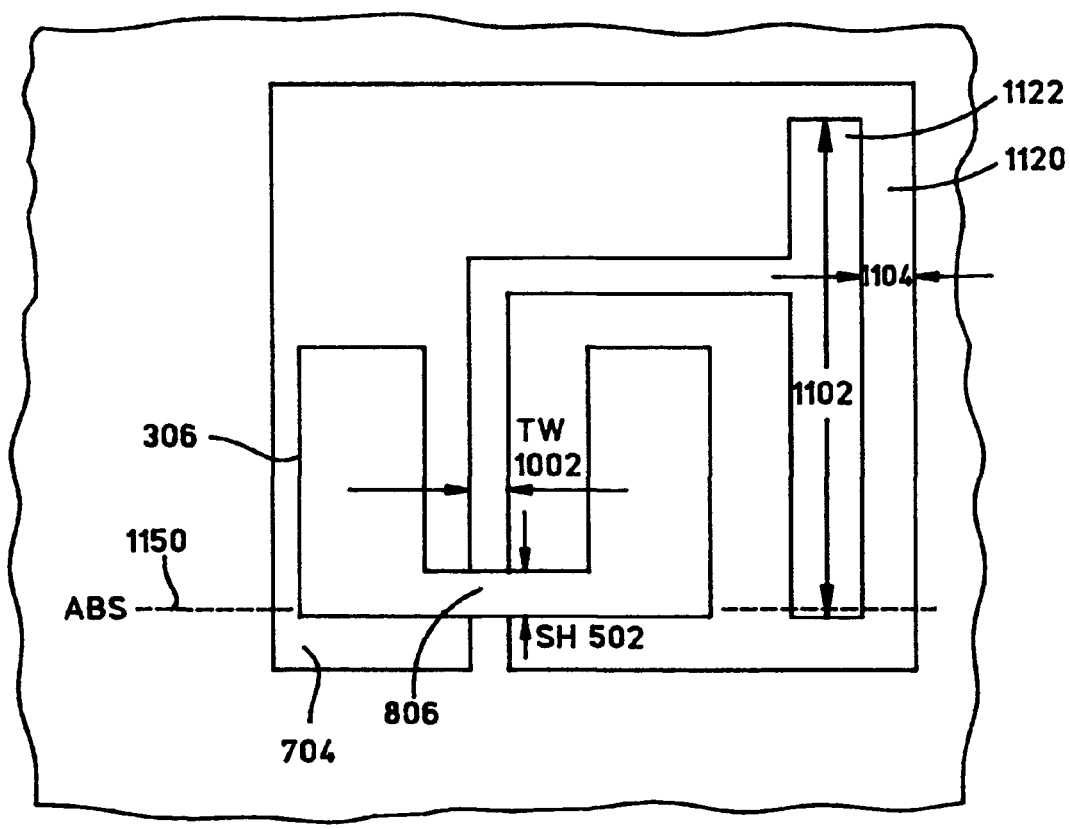
FIG. 15 is a top view of a partially constructed magnetic head which shows a partially-etched read sensor structure and the second mask used to form both the TW and the severable shunt behind the ABS.

The severable shunt may be located in any suitable position on the wafer. FIG. 13 is a top view of a partially constructed magnetic head which shows a partially-etched read sensor structure 306 and an alternative mask 704 used to simultaneously form both TW 1002 and severable shunt 1120 behind ABS 1150. FIG. 14 is a top view of a partially constructed magnetic head which shows a partially-etched read sensor structure 306 and another alternative mask 704 used to simultaneously form both TW 1002 and severable shunt 1120 well behind ABS 1150. Note that severable shunt 1120 of FIG. 14 will be severed when the wafer is back-lapped behind ABS 1150. Finally, FIG. 15 is a top view of a partially constructed magnetic head which shows a partially-etched read sensor structure and yet another alternative mask 704 used to simultaneously form both TW 1002 and severable shunt 1120 on the side, perpendicular to ABS 1150. As appropriate, the severable shunt may be severed using any suitable method including cutting, lapping, or exposure to laser beam, for any of the different embodiments.

In each case of FIGS. 12-15, mask 704 is formed as a slotted structure to define TW 1002 where, at the end of the slot, severable shunt 1102 is located. An exposed area 1104 (which is rectangular in the cases of FIGS. 12-15) may be also be formed as shown at the end of the slot. Exposed area 1104 has a width 1102 and a length 1104 which may be adjusted and determined in advance. By adjusting width 1102 and length 1104 of exposed area 1104, the resistance R for severable shunt 1102 may be varied for determining the proper amount of ESD protection desired or needed.

Advantageously, a shunt may be formed at the same time the read sensor is being made. By offering different resistances for the shunt, different levels of protection may be realized. Depending on the configuration, the shunt may be severed during the cutting and lapping at the ABS, or by back lapping behind the ABS, or by cutting, etc. Other techniques for severing the shunt may be utilized, such as by exposing the shunt to a laser beam.

As described herein, a method of making a read sensor while protecting it from electrostatic discharge (ESD) damage includes the steps of forming a resist layer over a plurality of read sensor layers; performing lithography with use of a mask to form the resist layer into a patterned resist which exposes left and right side regions over the read sensor layers and a shunt region; etching, with the patterned resist in place, to remove materials in the left and right side regions and in the shunt region; and depositing, with the patterned resist in place, left and right hard bias and lead layers in the left and right side regions, respectively, and in the shunt region for forming a severable shunt which electrically couples the left and right hard bias and lead layers together for ESD protection. The left and right hard bias and lead layers and the severable shunt may be formed in the same plane. The severable shunt may be formed in front of the ABS, behind the ABS, or on the side perpendicular to the ABS, and may be severed by any suitable method including cutting, lapping, or exposure to laser beam.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A method of making a read sensor while protecting it from electrostatic discharge (ESD) damage, comprising:
    forming a resist layer over a plurality of read sensor layers;
    performing lithography with use of a mask to form the resist layer into a patterned resist which exposes left and right side regions over the read sensor layers and simultaneously exposes a shunt region defined in front of an air bearing surface (ABS) of the read sensor;
    etching, with the patterned resist in place, to remove sensor layer materials in the left and right side regions for defining a trackwidth of the read sensor and to simultaneous remove sensor layer materials in the shunt region defined in front of the ABS;
    depositing, with the patterned resist in place, left and right hard bias and lead layers in the left and right side regions, respectively, and in the shunt region for forming, in front of the ABS, a severable shunt which lies in the same plane as and electrically couples the left and right hard bias and lead layers together; and
    cutting and lapping along the ABS.

2. The method of claim 1, wherein the severable shunt is for electrically coupling the left and right hard bias and lead layers together for ESD protection.

3. The method of claim 1, further comprising:
determining a width and a length of the severable shunt for providing a proper amount of ESD protection for the read sensor.

4. The method of claim 1, further comprising:
prior to making the read sensor, determining a width and a length of the severable shunt to adjust a resistance R thereof, for providing a proper amount of ESD protection for the read sensor.

5. The method of claim 1, further comprising:
severing the severable shunt during the cutting and lapping.

6. The method of claim 1, further comprising:
severing the severable shunt by exposure to a laser beam.

7. The method of claim 1, wherein the act of etching comprises ion milling.

8. The method of claim 1, further comprising:
providing the mask with a slotted structure for defining both the trackwidth and the severable shunt.

9. The method of claim 1, further comprising:
providing the mask with a slot for defining the trackwidth and, at the end of the slot, the severable shunt.

10. A method of making a magnetic head while protecting a read sensor from electrostatic discharge (ESD) damage, comprising:
forming a first resist layer over a plurality of read sensor layers;
performing lithography with use of a first mask to form the first resist layer into a first patterned resist which exposes left and right side regions over the read sensor layers;
etching, with the first patterned resist in place, to remove materials in the left and right side regions to thereby form a read sensor structure;
forming insulator materials in the left and right side regions adjacent the read sensor structure;
removing the first patterned resist and forming a second resist layer over the structure;
performing lithography with use of a second mask to form the second resist layer into a second patterned resist which exposes left and right side regions over the read sensor structure and contemporaneously exposes a shunt region defined in front of an air bearing surface (ABS) of the magnetic head;
etching, with the second patterned resist in place, to remove materials in the left and right side regions for defining a trackwidth of the read sensor and contemporaneously removing materials in the shunt region defined in front of the ABS;
depositing, with the second patterned resist in place, left and right hard bias and lead layers in the left and right side regions, respectively, and contemporaneously in the shunt region for forming, in front of the ABS, a severable shunt which lies in the same plane as and electrically couples the left and right hard bias and lead layers together; and
cutting and lapping along the ABS.

11. The method of claim 10, wherein the severable shunt is for electrically coupling the left and right hard bias and lead layers together for ESD protection.

12. The method of claim 10, further comprising:
determining a width and a length of the severable shunt for providing a proper amount of ESD protection for the read sensor.

13. The method of claim 10, further comprising:
prior to making the read sensor, determining a width and a length of the severable shunt to adjust a resistance R thereof, for providing a proper amount of ESD protection for the read sensor.

14. The method of claim 10, further comprising:
providing the mask with a slotted structure for defining both the trackwidth and the severable shunt.

15. The method of claim 10, further comprising:
providing the mask with a slot for defining the trackwidth and, at the end of the slot, the severable shunt.

16. The method of claim 10, wherein the acts of etching comprise ion milling.

17. The method of claim 10, wherein a resistance R of the severable shunt is between zero and tens of ohms.

18. The method of claim 10, further comprising:
severing the severable shunt by exposure to a laser beam.

19. A method of making a read sensor, comprising:
forming a patterned resist over a read sensor structure;
etching, with a patterned resist in place, to remove materials in left and right side regions to define a trackwidth of the read sensor and to simultaneous remove materials in a shunt region defined in front of an air bearing surface (ABS) of the read sensor; and
depositing, with the patterned resist in place, left and right hard bias and lead layers in the left and right side regions, respectively, and in the shunt region for forming, in front of the ABS, a shunt which lies in the same plane as and electrically couples the left and right hard bias and lead layers together for electrostatic discharge (ESD) damage protection.

20. The method of claim 19, further comprising:
performing lithography with use of a mask to form a resist layer into the patterned resist which exposes the left and right side regions and simultaneously exposes the shunt region defined in front of the ABS.

21. The method of claim 19, further comprising:
providing a mask with a slotted structure for defining both the trackwidth and the shunt; and
performing lithography with use of the mask to form a resist layer into the patterned resist which exposes left and right side regions over the read sensor structure and simultaneously exposes a shunt region defined in front of the ABS.

22. The method of claim 19, further comprising:
prior to making the read sensor, determining a width and a length of the shunt to adjust a resistance R thereof, for providing a proper amount of ESD protection for the read sensor.

* * * * *